US007201953B2

(12) United States Patent
Fischer et al.

(10) Patent No.: US 7,201,953 B2
(45) Date of Patent: *Apr. 10, 2007

(54) METHOD FOR THE PRODUCTION OF A MULTI-LAYER IDENTITY CARD OF PLASTIC

(75) Inventors: Dirk Fischer, Paderborn (DE); Ralf Henn, Hardert (DE)

(73) Assignee: Orga Kartensysteme and Lohmann GmbH & Co. KG (DE)

( * ) Notice: Subject to any disclaimer, the term of this patent is extended or adjusted under 35 U.S.C. 154(b) by 152 days.

This patent is subject to a terminal disclaimer.

(21) Appl. No.: 10/806,900

(22) Filed: Mar. 22, 2004

(65) Prior Publication Data

US 2004/0247841 A1 Dec. 9, 2004

Related U.S. Application Data

(63) Continuation-in-part of application No. 09/530,809, filed as application No. PCT/DE99/02663 on Aug. 26, 1999, now abandoned.

(51) Int. Cl.
*B32B 31/20* (2006.01)
*C09J 7/02* (2006.01)

(52) U.S. Cl. ...................... 428/143; 428/149; 428/204; 428/412; 428/480; 428/516; 428/915; 428/916; 156/321

(58) Field of Classification Search ................ 428/143, 428/149, 204, 412, 516, 480, 915, 916; 156/321
See application file for complete search history.

(56) References Cited

U.S. PATENT DOCUMENTS

| | | | | |
|---|---|---|---|---|
| 3,870,582 | A | | 3/1975 | Brackett et al. |
| 4,389,472 | A | * | 6/1983 | Neuhaus et al. .............. 430/10 |
| 4,455,359 | A | * | 6/1984 | Patzold et al. ................ 430/10 |
| 4,788,102 | A | * | 11/1988 | Koning et al. ............ 428/40.1 |
| 4,939,036 | A | | 7/1990 | Reith |
| 5,208,110 | A | * | 5/1993 | Smith et al. ................ 428/414 |
| 6,817,630 | B1 | * | 11/2004 | Fischer et al. ................ 283/67 |

FOREIGN PATENT DOCUMENTS

| | | |
|---|---|---|
| DE | 19631283 | 2/1998 |
| EP | 0348349 | 12/1989 |
| EP | 0483087 | 4/1992 |
| WO | WO-97 21777 | 6/1997 |

* cited by examiner

*Primary Examiner*—Daniel Zirker
(74) *Attorney, Agent, or Firm*—Berliner & Associates

(57) ABSTRACT

An improvement applicable to a method for the production of a multi-layer identity card of plastic wherein the card comprises one or more card core layers bonded under the action of pressure and heat and printed on either side or on opposite sides with a covering layer applied to the printed side or sides of the card core. In accordance with the improvement a thermoplastic polymer adhesive is applied between and in direct contact with each covering layer and the respective printed side of the card core, the thermoplastic adhesive coating possessing at least one additive that increases the friction between the covering layer and the printed card core during lamination so as to prevent displacement of the printed card core in relation to the covering layer or layers.

24 Claims, 5 Drawing Sheets

FIG. 3
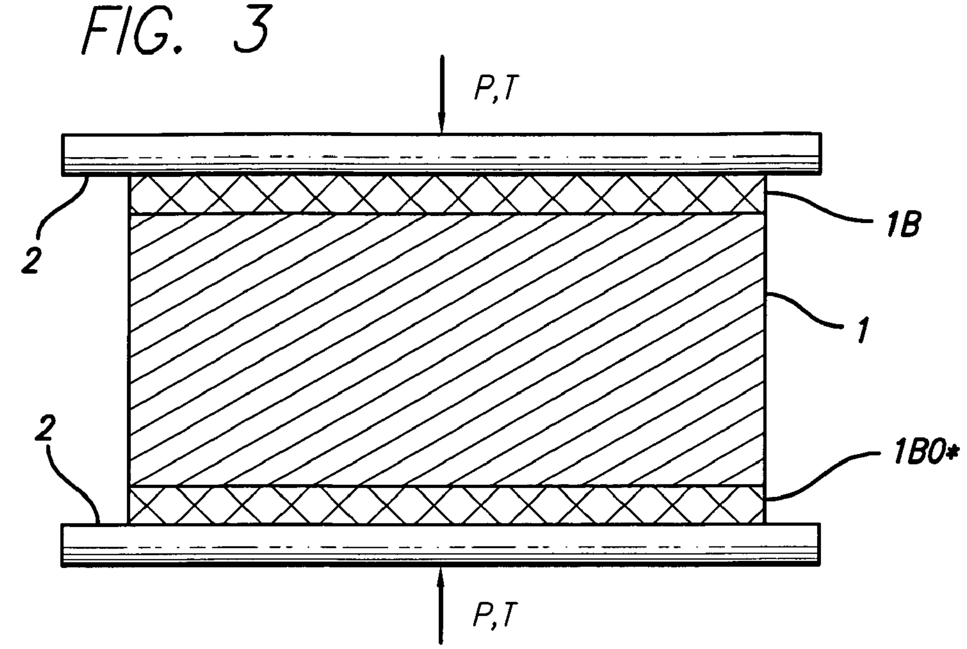
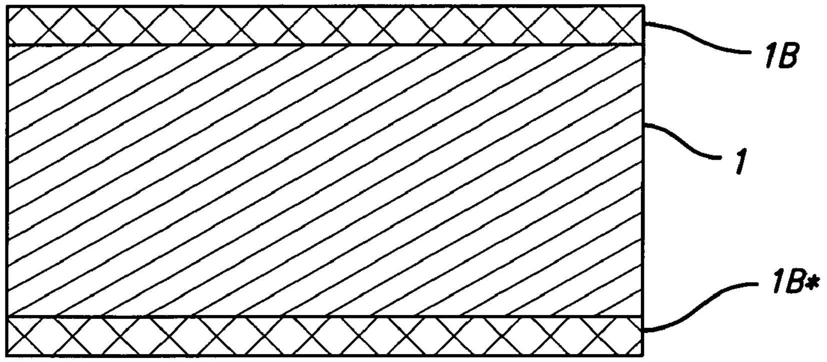
FIG. 4
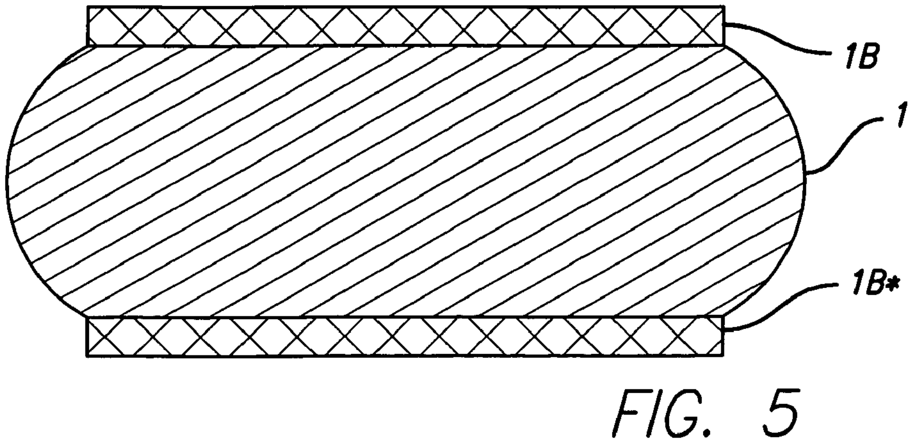
FIG. 5

FIG. 6
ORGA
ORGA
ORGA
ORGA
ORGA
ORGA
ORGA
ORGA
ORGA
ORGA
ORGA
ORGA
ORGA
ORGA
ORGA
ORGA
ORGA
ORGA
ORGA
ORGA
ORGA

METHOD FOR THE PRODUCTION OF A MULTI-LAYER IDENTITY CARD OF PLASTIC

CROSS-REFERENCE TO RELATED APPLICATION

This application is a continuation-in-part of application U.S. patent application Ser. No. 09/530,809, now abandoned, which was filed Jul. 31, 2000, which was filed pursuant to 35 U.S.C. § 371 from PCT International Application No. PCT/DE99/02663 having an International Filing Date of Aug. 26, 1999 and a Priority Date of Sep. 5, 1998.

FIELD OF THE INVENTION

The invention relates to a method for the production of multi-layer identity cards of plastic.

BACKGROUND OF THE INVENTION

Multi-layer identity cards of plastic possess at least one card core of an integral card core layer or ply printed on both sides or at least two card core layers, which are in this case respectively printed on one side. An adhesive coated covering layer is then to be applied to each side of the card core printed on either side. The card layers are joined together in laminating process.

The adhesive coated covering layer, which is usually made transparent, has its adhesive coating adhering to the printed card core, and serves inter alia for protecting the print. Furthermore it is possible for the covering layer to contain certain additives for example, which are necessary for later laser inscription on the identity card.

In order to enhance the appeal of the identity cards to the eye or for safety reasons or for some other reason the cards are frequently printed on either side and not only on one side.

Such multi-layer identity cards are widely employed as check or bank cards. Frequently, such cards are also provided with a magnetic strip or an integrated circuit (semiconductor component or chip). Identity cards with a chip are known as chip cards or smartcards. Thus multi-layer identity cards with a chip are employed on a large scale as an authorization means for access to GSM mobile telephony so that when the owner of the identity card plugs it (the GSM card) in a mobile radio terminal he informs the mobile communications network that he is authorized.

For the card layers—both the card core layers and also the covering layers—various different materials come into question: polyvinyl chloride (PVC), polycarbonate (PC), acrylonitrile-butadiene-styrene (ABS), polyethylene terephthalate (PET, PETG and PETF). The selection of the materials and accordingly of the card structure is dependent on different factors. These factors are for instance: the desired mechanical properties of the identity card to be manufactured, its behavior at high and low temperatures, the question of printability, the question of laser inscription and furthermore economic and ecological determinants.

Dependent on which card structure is selected, different laminating parameters (temperature, pressure and time) come into play. Same are dependent more especially on which material is utilized for the card core layers.

Multi-layer identity cards are manufactured by firstly producing either the integral card core layer printed on both sides or producing the card core layers printed on one. Then the adhesive coated covering layers are produced. Following this the card layers produced are brought into register and in this state placed in a laminating press, wherein they are joined together under pressure and while heated. Moreover, there is a provision such that the card layers to be laminated are fed using rolls and are united in the so-called roll laminating method.

However in this case, more particularly in the case of fairly high temperatures of lamination (>120 degrees C.) a problem has occurred in the case of the lamination of identity cards with a card core printed on either side, which does not occur in the case of the lamination of cards printed on only one side.

In fact above a certain lamination temperature in the lamination of identity cards, which have a card core printed on either side (irrespectively of whether same is itself of single piece or of multi-layer structure), there is an undesired deformation or displacement of the printed card core in relation to the covering layers arranged on either side of it, which are in direct contact with the press platens acting on them during lamination. The printed card core and the covering layers are then no longer in register with each other and the outline of the card is no longer in accordance with requirements. The card must be discarded as a reject which can not be used.

The reason for the displacement of the printed card core in relation to the covering layers is taken to be that while the covering layers rest without any possibility of slip against the lamination platens on either side of the card structure to be laminated, above a certain lamination temperature the adhesive coating on the covering layers will form a sort of lubricating film between the printed card core and the covering layer, on or between which the printed card core moves out of position in relation to the covering layers. Then the formation of a lubricating film is even more encouraged owing to presence of the printing ink film.

This also seems to be the reason for this problem in the lamination of identity cards not occurring in cases wherein only one side of the card is printed. In this case the unprinted side of the card core—just like the opposite covering layer on the printed card side—is directly on the laminating press platen without any possibility of slipping and thus holds the card core layer in place, even if a lubricating film has formed on the other side between the covering layer and the printed card core. The problem also fails to occur in the case of cards which are not marginally printed.

SUMMARY OF THE INVENTION

The foregoing problems are solved by the present invention. One object of the present invention is to so manufacture a multi-layer identity card of the type initially mentioned that a displacement of the bilaterally printed card core in relation to the covering layers is effectively prevented even in the case of relatively high lamination temperatures, there additionally being a higher strength of bonding of the multi-layer identity card.

This object is to be attained by a method for production and a covering layer in which the thermoplastic adhesive coating possesses at least one additive that increases the friction between the covering layer and the printed card core during lamination so as to prevent displacement of the printed card core in relation to the covering layer or layers. The following are further advantageous and useful developments of the invention:

the thermoplastic adhesive coating has silica as an additive;

the thermoplastic adhesive coating has silicate as an additive;

the thermoplastic adhesive coating has calcium carbonate as an additive.

the percentage by weight of the additives in the thermoplastic adhesive coating amounts to between 0.1% and 60%.

the card comprises one or more card core layers bonded under the action of pressure and heat and printed on either side or on opposite sides with a covering layer applied to the printed side or sides of the card core, and in which a thermoplastic polymer adhesive is between and in direct contact with each covering layer and the respective printed side of the card core;

the thermoplastic adhesive coating possesses at least one additive that increases the friction between the covering layer and the printed card core during lamination so as to prevent displacement of the printed card core in relation to the covering layer or layers;

the thermoplastic adhesive coating has a thickness between 0.1 μm and 20 μm;

the thermoplastic adhesive coating has a surface roughness; and the percentage by weight of the additives in the thermoplastic adhesive coating amounts to between 0.1% and 60%.

In accordance with the invention adhesive coated covering layers are employed, whose adhesive coating comprises at least one additive able to increase the friction between the covering layer and the printed card core during lamination so that displacement of the printed card core in relation to the covering layers is effectively prevent. For this purpose additives in the form of silica ($SiO_2$), silicates and calcium carbonate ($CaCO_2$) have proved suitable. In the course of the production and/or application of the adhesive coating on the covering layer these additives are homogeneously dispersed in the adhesive coating. In the case of adhesive coating itself it is a question preferably of a thermoplastic adhesive as for instance on the basis of polyamides, polyesters or polyurethanes or copolymers thereof. In one embodiment the adhesive coating only comprises mixed in silica or only silicate or only calcium carbonate as an additive. In an alternative embodiment there is a provision such that a mixture of two or more additives is added to the adhesive coating. The surfaces of the additives employed may furthermore be so chemically modified that for example the embedding of the additives in the material of the adhesive coating is improved. Thus it is for instance possible in the case of the use of silica ($SiO_2$) as an additive it is possible to use silica with different silane coatings.

The silica may be in the form of naturally occurring silica such as sand, quartz or quartzite or synthetic silica.

As silicate talcum is preferably employed. As calcium carbonate naturally occurring calcium carbonates, such as chalk or limestone or synthetically precipitated calcium carbonates come into question.

The percentage by weight of the additives in the adhesive coating amounts to at least 0.1% and at the most 60%.

Owing to the use of the adhesive coated covering layers in accordance with the invention the formation of a lubricating film in between the covering layers is prevented. The additives employed possess a comparatively large surface area related to their weight. The mobility of the chain molecules of the adhesive coating is reduced by the additives. Furthermore, there is an addition of polymer segments of the adhesive coating on the surface of the additives so that furthermore adjacent polymer segments of the adhesive coating are limited in their mobility. All in all it is possible to say that owing to the presence of the additives the rheology of the adhesive coating is so altered as regards the lamination parameters that the viscosity of the adhesive coating is increased so that is favorable as regards the present application.

In the case of additives modified with silane furthermore the chemical cross linking between polymer-specific silane adhesive promoter groups and polymer segments of the adhesive system employed is caused to occur so that in addition the cohesion (internal strength) of the adhesive formulation is increased.

The adhesive coated covering layers in accordance with the invention with the above mentioned additives also possess the advantage that when same are rolled up or placed on top of each other they do not permanently stick together and therefore may be more readily rolled up or singulated than is the case with covering layers in accordance with the prior art.

In order to ensure that air may escape from between the adhesive coated covering layer and the printed card core during lamination, the adhesive coating additionally possesses a rough surface.

BRIEF DESCRIPTION OF THE DRAWINGS

The invention will now be described in the following with reference to accompanying drawings in detail, wherein:

FIG. 3 shows the card layers during lamination;

FIG. 4 shows a section taken through card sheet successfully laminated in accordance with the invention without displacement of the card core;

FIG. 5 is a section taken through a laminated card sheet in accordance with the prior art impaired by displacement of the card core;

DETAILED DESCRIPTION OF THE INVENTION

Figure 1:
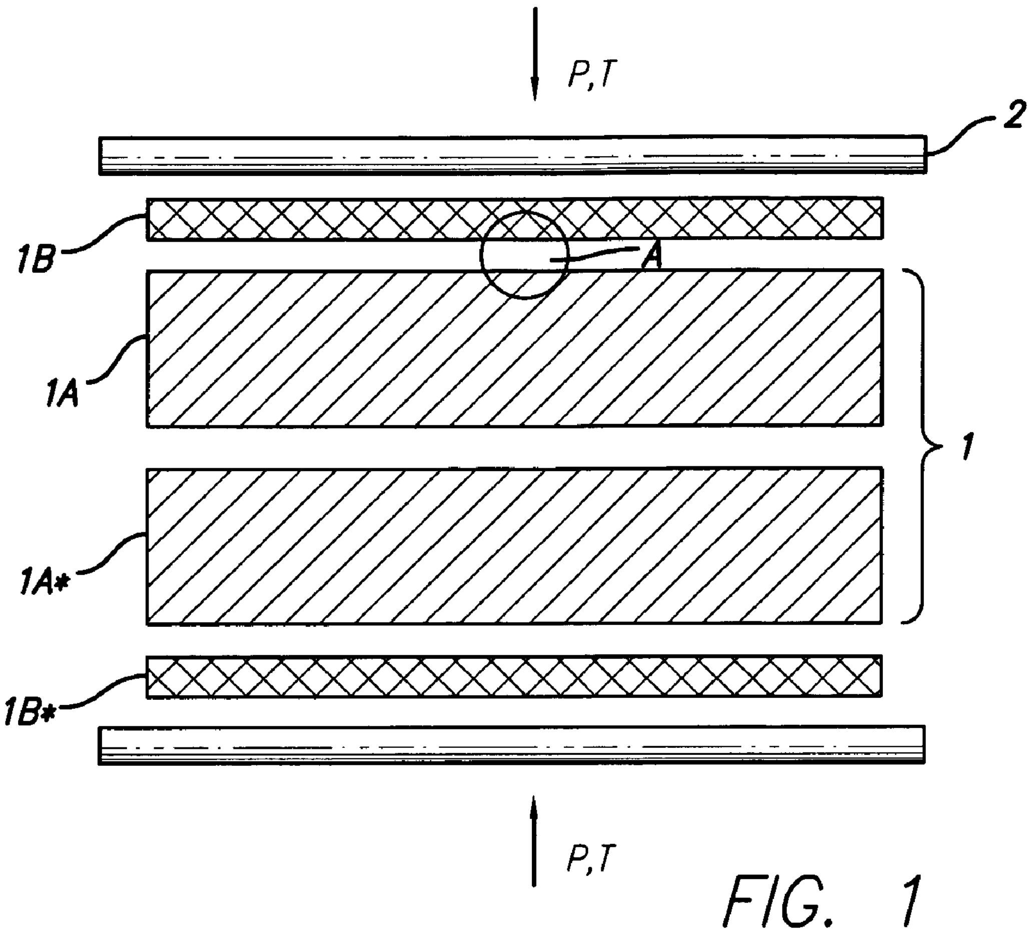
FIG. 1 shows the card layers to be laminated in an exploded view between the lamination platens of a laminating press.

In accordance with the invention, an improvement is provided that is applicable to a method for the production of a multi-layer identity card of plastic wherein the card comprises one or more card core layers bonded under the action of pressure and heat and printed on either side or on opposite sides with a covering layer applied to the printed side or sides of the card core. In accordance with the improvement a thermoplastic polymer adhesive is applied between and in direct contact with each covering layer and the respective printed side of the card core, the thermoplastic adhesive coating possessing at least one additive that increases the friction between the covering layer and the printed card core during lamination so as to prevent displacement of the printed card core in relation to the covering layer or layers.

More particularly, and referring generally to the Figures, a multi-layer identity card of plastic and its method for the production comprises at least one card core (1) of a single piece card core layer (1A) printed on either side or at least two card core layers (1A and 1A*), which are respectively printed on one side, and on the printed sides of the card core (1) a covering layer (1B and 1B*) is to be applied to the printed side or sides of the card core. The method to which the improvement of the invention applies, and which results in a novel card of this invention, comprises the following steps: (a) preparing (i) an integral card core layer (1A) printed on either side, or (ii) card core layers (1A and 1A*) printed on one side and placed on top of each other in register, (b) preparing the thermoplastic adhesive coated covering layers (1B and 1B*), and (c) introducing the integer card core layers or registered card core layers (1A, 1A*, 1B and 1B*) placed on top of one another in register into a laminating press, wherein the card layers (1A, 1A*, 1B and 1B*) are bonded together under the action of pressure and heat. In accordance with the improvement provided by the invention, the covering layer is coated and in contact with an adhesive comprising a thermoplastic polymer and the adhesive in turn is in contact with the printed side or sides of the card core, and thermoplastic adhesive coated covering layers (1B and 1B*) are used whose thermoplastic adhesive coating (1B0 and 1B0*) possesses at least one additive (Z) increasing the friction between the covering layer (1B and 1B*) and the printed card core (1) during lamination so that a displacement of the printed card core (1) in relation to the covering layers (1B and 1B*) is prevented.

In several embodiments, the thermoplastic adhesive coating (1B0 and 1B0*) of the thermoplastic adhesive coated covering layer (1B and 1B*) has silica ($SiO_2$), silicate, and/or calcium carbonate as one or more an additives (Z). In another embodiment, the percentage by weight of the additives (Z) in the thermoplastic adhesive coating (1B0 and 1B0*) amounts to between 0.1% and 60%. In another embodiment, the thermoplastic adhesive coating (1B0 and 1B0*) has a thickness between 0.1 μm and 20 μm. In another embodiment, the thermoplastic adhesive coating (1B0 and 1B0*) has a surface roughness.

In FIG. 1 the card layers—shown at a distance apart from each other—will be seen between the platens 2 of a laminating press. The card structure comprises two card core layer 1A and 1A*, which are respectively printed on one side, and two adhesive coated covering layers 1B and 1B*, which have the printed card core between them in a sandwich array.

Figure 6:
FIG. 6 shows a plan view of a printed card core without a covering layer.

For the manufacture of the card body laminated in accordance with the invention it is preferred to employ the so-called multiple impression system—as distinguished from individual card production—so that the output rate is much greater than with individual card production. In the case of multiple impression manufacture for each card layer use is made of multiple impression sheet (printed card core sheets and adhesive coated covering layer sheets) each having a plurality of individual elements for the production of a plurality of laminated card core bodies. For this purpose the printed card core layer sheets possess a plurality of identical printed images, see FIG. 6. After lamination the individual card bodies are produced by being stamped out of the sheet. Both in individual card manufacture and also in multiple impression manufacture the layers or, respectively, sheets must be laid in register on top of each other before lamination. For the novel method it is a matter of indifference whether production is performed using the individual card method, the multiple card method or the roll lamination method.

Figure 2:
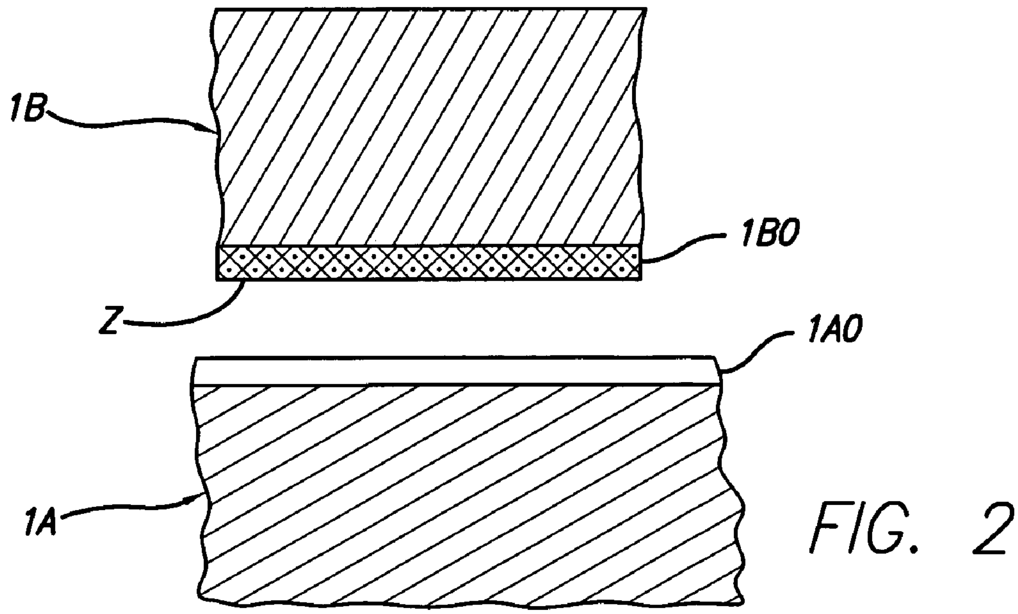
FIG. 2 shows, on a larger scale, a part with the covering layer and the card core layer.

In FIGS. 2 and 3, the section A of FIG. 1 will be seen on a larger scale. The reader will see the adhesive coating 1B0 on the covering layer 1B and also the printing ink layer 1A0 on the card core layer 1A. The additives Z are present in the adhesive coating 1B0 to prevent a lubricating film being formed during lamination between the covering layers 1B0 and 1B* and the printed card core 1.

The thickness of the ink layer 1A0 is for example in the case of offset litho printing between 2 gm and 4 gm, while in the case of screen printing it can be for example up to 10 μm. The thickness of the covering layer 1B—without an adhesive coating 1B0—will amount, for example, to between 40 μm and 50 μm. The thickness of the adhesive coating 1B0 on the covering layer 1B will preferably amount to approximately 6 to 10 μm. All in all the adhesive coating in accordance with the invention will possess a thickness 0.1 to 20 μm. In the case of a standardized card thickness of 760 μm the thickness of the card core layers 1A and 1A*, which are printed on one side, will then be approximately 320 μm.

In the case of an embodiment, which is not illustrated, one or two further unprinted card core layers are placed between the card core layers printed on one side, the thickness of the individual layers then being correspondingly less.

Instead of card core layers 1A and 1A* respectively printed on one it is possible for a single integral card core layer printed on either side to be utilized.

Figure 7:
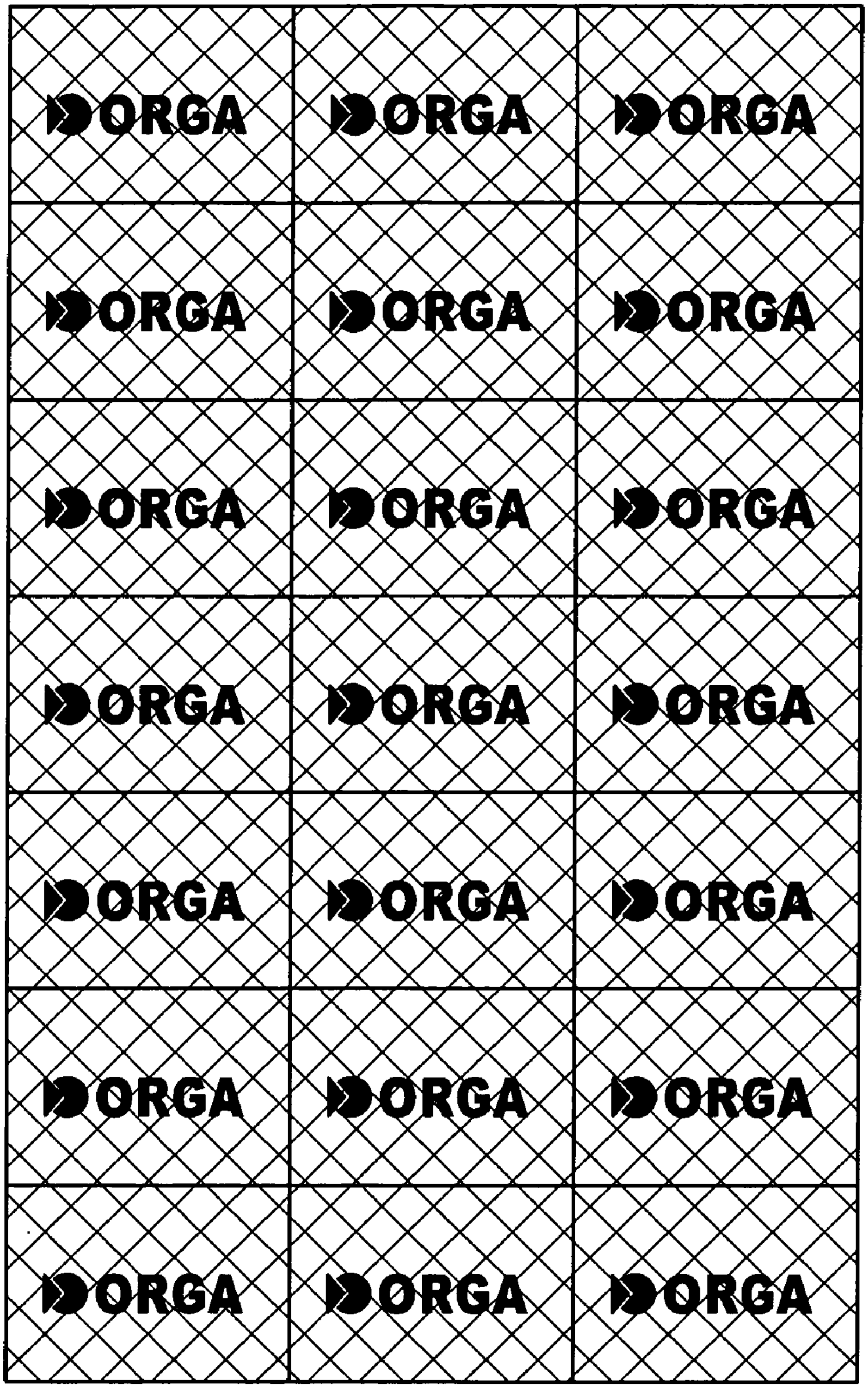
FIG. 7 is a plan view of a card sheet laminated in accordance with the invention having a covering layer.

FIG. 4 is a section taken through a successfully laminated card sheet. The corresponding plan view is to be seen in FIG. 7. In this case there is no displacement (accompanied by slip and escape of adhesive at the side) of the printed card core 1 in relation to the covering layers 1B and 1B* smaller arranged on either side. This is achieved in accordance with the invention by the use of adhesive coated covering layers 1B and 1B*, which possess additives Z in the adhesive coating 1B0 and 1B0*, which increase friction between the printed card core 1 and the covering layers 1B0 and 1B0* during lamination. The card sheet successfully produced in this manner is then, after lamination, cut up by stamping out the individual identity cards.

Figure 8:
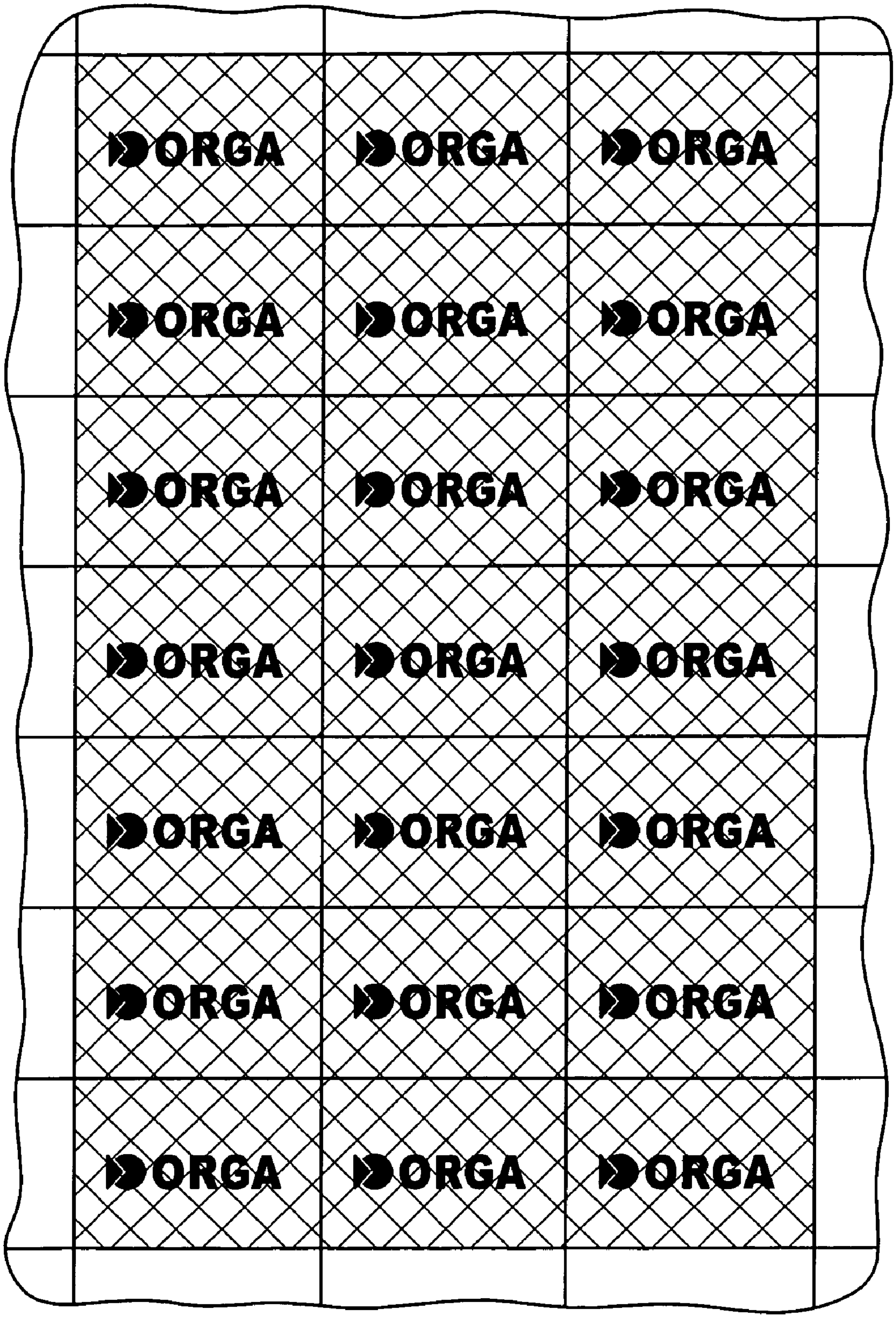
FIG. 8 is a plan view of a card sheet laminated in accordance with the prior art having a covering layer.

To make things generally clearer FIG. 5 shows a section taken through a laminated card sheet in accordance with the prior art, in which there is a substantial displacement of the printed card core 1. The corresponding plan view is shown in FIG. 8. The displacement is on all sides. In addition to the displacement of the card core 1 as such the printed image thereon is also displaced, that is to say in the prior art there is a distorted printed image.

The invention claimed is:

1. A method for the production of a multi-layer identity card of plastic wherein the card comprises an assembly of one or more card core layers printed on either side or on opposite sides with a covering layer applied to the printed side or sides of the card core, and in which a thermoplastic polymer adhesive is applied between and in direct contact with each covering layer and the respective printed side of the card core, comprising:

providing each thermoplastic adhesive coating with at least one friction-increasing additive; and bonding the assembly under the action of pressure and sufficient heat to laminate the assembly, whereby the friction-increasing additive increases the friction between the covering layer and the printed card core during lamination so as to prevent displacement of the printed card core in relation to the covering layer or layers.

2. The method as set forth in claim 1, wherein the friction-increasing additive is silica.

3. The method as set forth in claim 2 wherein the friction-increasing additive is or contains silicate.

4. The method as set forth in claim 3, wherein the percentage by weight of the additives in the thermoplastic adhesive coating amounts to between 0.1% and 60%.

5. The method of claim 3, wherein the friction-increasing additive is or contains calcium carbonate.

6. The method as set forth in claim 2, wherein the percentage by weight of the additives in the thermoplastic adhesive coating amounts to between 0.1% and 60%.

7. The method as set forth in claim 1, wherein the friction-increasing additive is silicate.

8. The method as set forth in claim 7, wherein the percentage by weight of the additives in the thermoplastic adhesive coating amounts to between 0.1% and 60%.

9. The method as set forth in any one of claims 1 though 7, wherein the friction-increasing additive is calcium carbonate.

10. The method as set forth in claim 9, wherein the percentage by weight of the additives in the thermoplastic adhesive coating amounts to between 0.1% and 60%.

11. The method as set forth in claim 1, wherein the percentage by weight of the additives in the thermoplastic adhesive coating amounts to between 0.1% and 60%.

12. The method of claim 1, wherein the assembly is bonded at a lamination temperature greater than 120 degrees centigrade.

13. A multi-layer identity card of plastic, comprising:

an assembly of one or more card core layers that were bonded under the action of pressure and sufficient heat to laminate the assembly, the card core layers having been printed on either side or on opposite sides with a covering layer applied to the printed side or sides of the card core, and in which a thermoplastic polymer adhesive is between and in direct contact with each covering layer and the respective printed side of the card core, each thermoplastic adhesive coating having at least one friction-increasing additive that increased the friction between the covering layer and the printed card core during lamination of the assembly and which prevented displacement of the printed card core in relation to the covering layer or layers.

14. The identity card as set forth in claim 13, wherein the friction-increasing additive is silica.

15. The identity card as set forth in claim 14, wherein the friction-increasing additive is or contains silicate.

16. The identity card as set forth in claim 15, wherein the thermoplastic adhesive coating has a thickness between 0.1 μm and 20 μm.

17. The identity card of claim 15, wherein the friction-increasing additive is or contains calcium carbonate.

18. The identity card as set forth in claim 14, wherein the thermoplastic adhesive coating has a thickness between 0.1 μm and 20 μm.

19. The identity card as set forth in claim 13, wherein the friction-increasing additive is silicate.

20. The identity card as set forth in claim 19, wherein the thermoplastic adhesive coating has a thickness between 0.1 μm and 20 μm.

21. The identity card as set forth in any one of claims 13 through 19, wherein the friction-increasing additive is or contains calcium carbonate.

22. The identity card as set forth in claim 21, wherein the thermoplastic adhesive coating has a thickness between 0.1 μm and 20 μm.

23. The identity card as set forth in claim 13, wherein the thermoplastic adhesive coating has a thickness between 0.1 μm and 20 μm.

24. The identity card of claim 13, wherein the lamination temperature under which the assembly had been bonded was greater than 120 degrees centigrade.

* * * * *